United States Patent
Cain et al.

(10) Patent No.: US 7,237,054 B1
(45) Date of Patent: Jun. 26, 2007

(54) SWITCHING INTERFACES IN EXTERNAL DISK DRIVES

(75) Inventors: William C. Cain, Foothill Ranch, CA (US); Barry L. Klein, Trabuco Canyon, CA (US); Kevin W. McLaughlin, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 531 days.

(21) Appl. No.: 10/789,889

(22) Filed: Feb. 27, 2004

(51) Int. Cl.
*G06F 3/00* (2006.01)
*G06F 13/00* (2006.01)
*H02N 11/00* (2006.01)

(52) U.S. Cl. ............... 710/305; 710/107; 710/300; 710/316

(58) Field of Classification Search ........... 710/107, 710/300, 305, 316
See application file for complete search history.

(56) References Cited

U.S. PATENT DOCUMENTS

| | | | |
|---|---|---|---|
| 5,986,880 A * | 11/1999 | Santeler et al. ........... 361/684 |
| 6,151,649 A * | 11/2000 | Liong et al. ........... 710/314 |
| 6,658,518 B2 * | 12/2003 | Domon ........... 710/305 |
| 6,898,730 B1 * | 5/2005 | Hanan ........... 714/7 |
| 2004/0107371 A1 * | 6/2004 | Kimura et al. ........... 713/300 |

* cited by examiner

Primary Examiner—Kim Huynh
Assistant Examiner—Scott Sun
(74) Attorney, Agent, or Firm—Jason T. Evans, Esq.

(57) ABSTRACT

In an external disk drive system comprising a disk drive, a bridge controller comprising a plurality of Bridge Controller Host (BCH) interfaces adapted to establish communication between the external disk drive system and an external device via a plurality of different communication mediums, a method for switching from a first BCH-interface communicating with the external device via a first communication medium to a second BCH-interface during the operation of the external disk drive system. The method comprising sensing a connecting of a second communication medium to the external disk drive system via the second BCH-interface; determining an interface priority of the second communication medium over an interface priority of the first communication medium; dismounting the disk drive from the first communication medium based on the determining; and mounting the disk drive to the second communication medium wherein the external disk drive system remains operational during the dismounting an mounting.

7 Claims, 3 Drawing Sheets

SWITCHING INTERFACES IN EXTERNAL DISK DRIVES

FIELD OF THE INVENTION

This invention relates to external disk drives. More particularly, the present invention is directed to switching interfaces in an external disk drive system.

BACKGROUND OF THE INVENTION

Disk drives are commonly used to store large amounts of data in a readily available form. Typically, the primary components of a disk drive are a head disk assembly and a printed circuit board assembly (PCBA) which, when fixed to one another, form a functional unit that is then connected to a computer.

One form of disk drive in use today is an external disk drive system which is a standalone unit that communicates with one or more host computers, generally via an external cable such as a universal serial bus (USB) cable or Firewire™ cable. In some configurations, other storage device peripherals such as a flash memory card reader may be integrated with the external disk drive system to communicate with the host via the external interface cable. An external disk drive system may also be adapted to connect to one or more hosts via more than one type of interface cable thus allowing the user to optimize a data transfer based on the characteristics of a selected cable, as well as using different cables for each of the external disk drive and the card reader.

Currently, however, connecting a second interface cable, such as a Firewire™, to an external disk drive system which is already in communication with a host via a first interface cable, such as a USB, may cause an undefined state in the external disk drive system wherein the second interface cable remains in a dismounted state and thus unused. As such, it is often required for the external disk drive system to be power cycled before the second interface cable becomes mounted to the external disk drive system, thus causing delays and suspensions in the operational status of the external disk drive system.

Accordingly, what is needed is an improved method for switching interfaces in an external disk drive.

SUMMARY OF THE INVENTION

This invention can be regarded as a method for switching in external disk drive system from a first Bridge Controller Host (BCH) interface communicating with the external device via a first communication medium to a second BCH interface during the operation of an external disk drive system. The external disk drive system comprising a disk drive, a bridge controller comprising a plurality of BCH interfaces adapted to establish communication between the external disk drive system and an external device via a plurality of different communication mediums. The method comprising sensing a connecting of a second communication medium to the external disk drive system via the second BCH interface; and determining an interface priority of the second communication medium over an interface priority of the first communication medium.

The method further comprising dismounting the disk drive from the first communication medium based on the determining; and mounting the disk drive to the second communication medium wherein the external disk drive system remains operational during the dismounting and mounting.

DETAILED DESCRIPTION OF THE INVENTION

Figure 1:
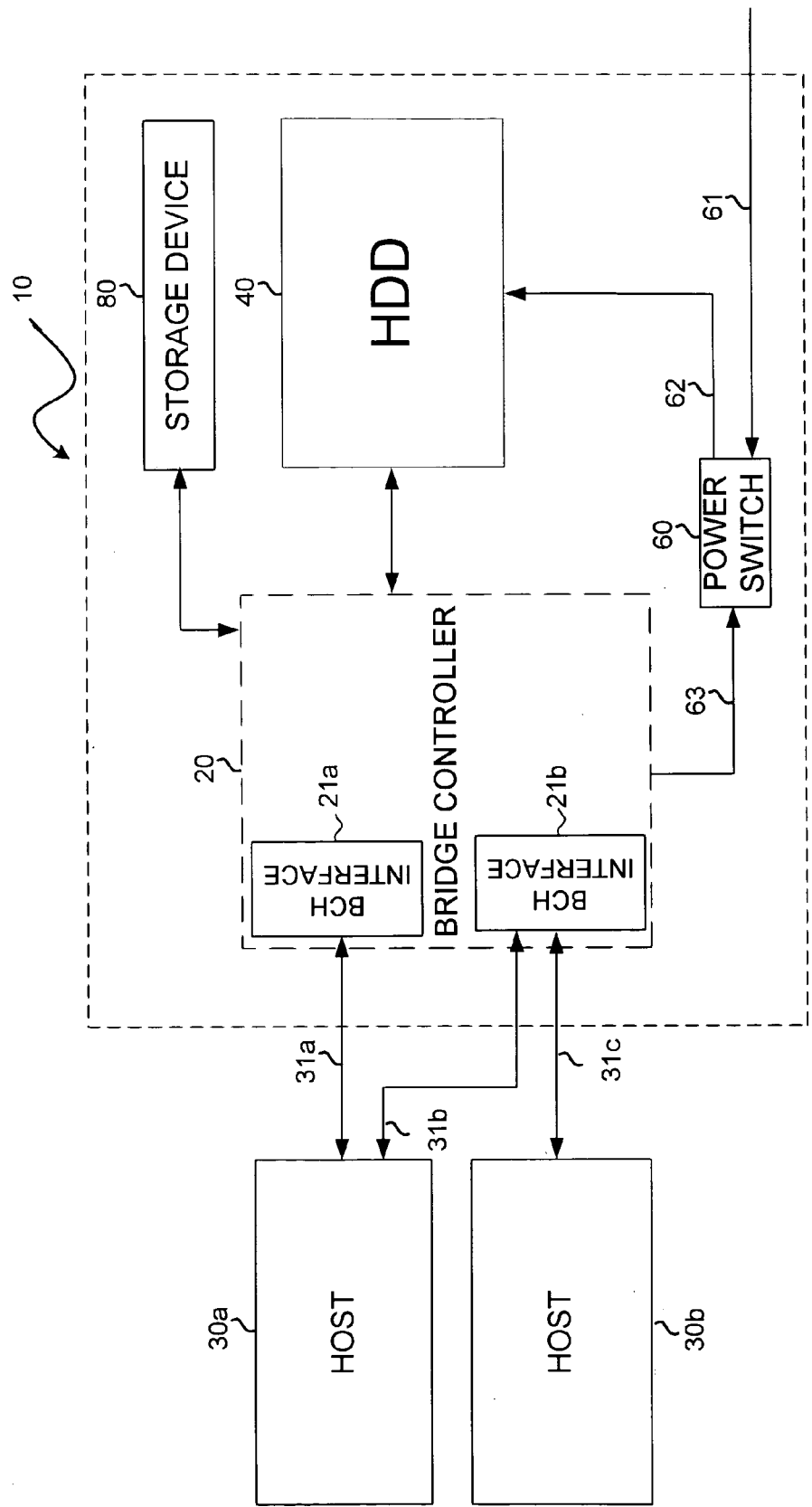
FIG. 1 illustrates an exemplary hard disk drive system in which the present invention may be practiced.

With reference to FIG. 1, an exemplary hard disk drive system 10 is shown in which the present invention may be practiced. As shown, the external disk drive system 10 comprises a disk drive 40, a bridge controller 20 comprising a plurality of Bridge Controller Host (BCH) interfaces 21a and 21b adapted to establish communication between the external disk drive system 10 and an external device 30a via a plurality of different communication mediums 31a and 31b. Suitably, the external device 30a is a host computer. Suitably the communication medium 31a is a universal serial bus (USB) cable. As also shown in FIG. 1, the external disk drive system 10 may be also be adapted to communicate with a plurality of external devices 30a and 30b via a plurality of BCH interfaces 21a and 21b and a plurality of different communication mediums 31a, 31b, 31c. During the operations of the disk drive 40, the bridge controller 20 transmits command 63 to the power switch 60 for providing the disk drive 40 with a DC operating current 62 inputted via line 61 from an external power source (not shown).

Figure 2:
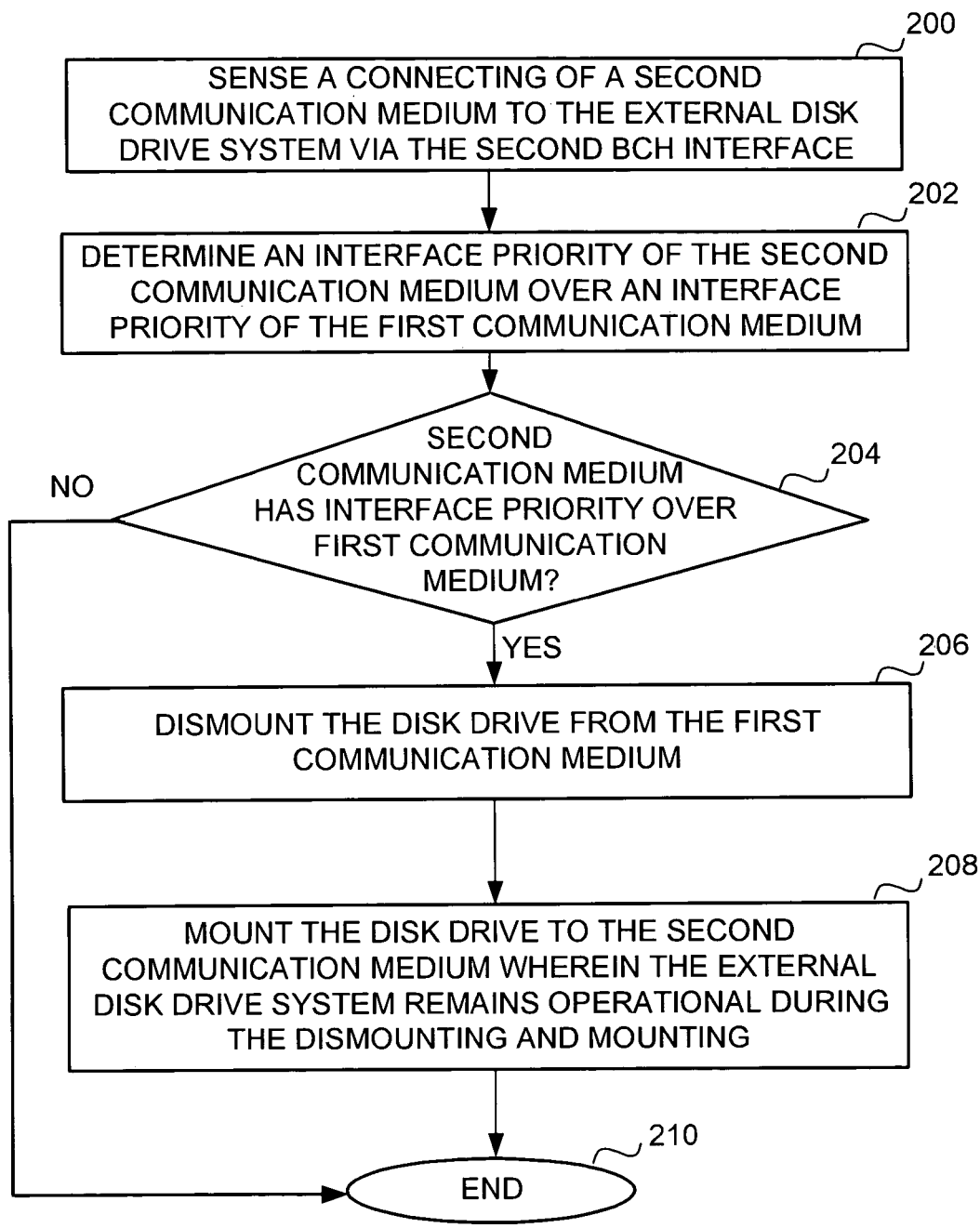
FIG. 2 is a flow chart illustrating a process used in an embodiment of the invention shown in FIG. 1.

FIG. 2 is a flow chart illustrating a process used in an embodiment of the invention shown in FIG. 1 for switching from BCH interface 21a communicating with the external device 30a via communication medium 31a to BCH interface 21b during the operation of the external disk drive system 10, suitably while the disk drive 40 is in an idle state in which read/write operations are not being performed. As shown in FIG. 2, the process begins in block 200 in which a connecting of communication medium 31b to the external disk drive system 10 via the second BCH interface 21b is sensed. Suitably, communication medium 31b comprises a Firewire™ cable.

Next, in block 202, an interface priority of communication medium 31b over an interface priority of communication medium 31a is determined. Suitably, the interface priority of communication medium 31a, and the interface priority of communication medium 31b are each pre-assigned. Next, in decision block 204, if it is determined that communication medium 31b does not have an interface priority over communication medium 31a, the flow then proceeds to block 210 in which the overall process ends. If, in decision block 204, it is determined that communication medium 31b has interface priority over communication medium 31a, the flow then proceeds to block 210 in which the disk drive 40 is dismounted from communication medium 31a. Next, in block 208 the disk drive 40 is then mounted to communication medium 31b wherein the external disk drive system 10 remains operational during the dismounting and mounting. Suitably, the above described determining, dismounting and mounting operations are performed by firmware executed in the bridge controller 20. The flow then proceeds to block 210 in which the overall process ends.

Figure 3:
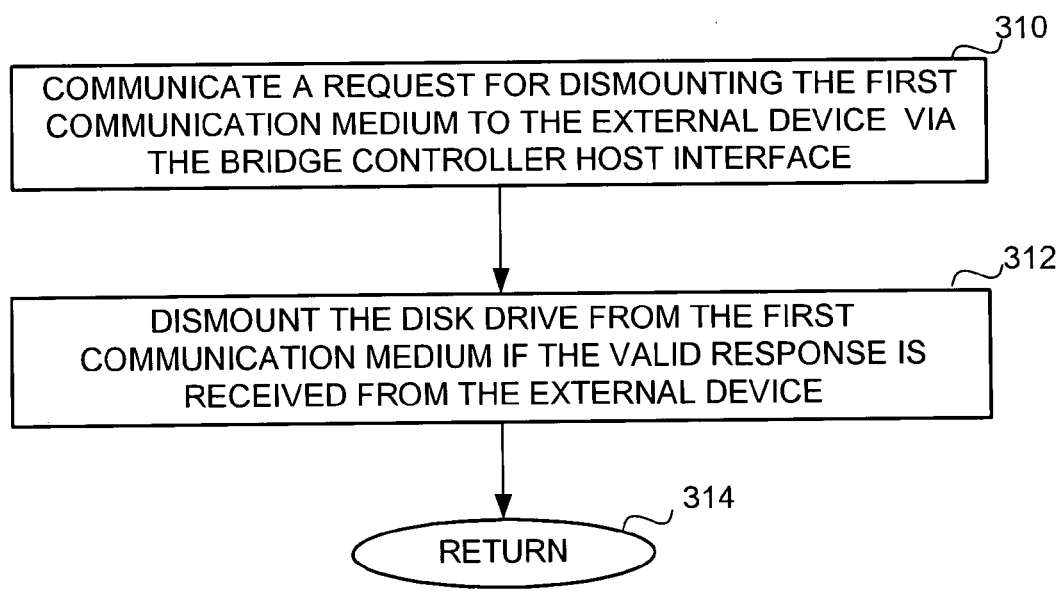
FIG. 3 is a flow chart further illustrating a process used in conjunction with the process shown in FIG. 2.

FIG. 3 is a flow chart further illustrating the dismounting process shown in block 206 of FIG. 2. As shown in FIG. 3, the process begins in block 310 in which a request for dismounting communication medium 31a is communicated to the external device 30a via the bridge controller host interface 21a. Next, in block 312, the disk drive 40 is dismounted from communication medium 31a if a valid response is received from the external device 30a. In this way, the external device 30a, such as a host computer, is allowed to first perform any recommended host-end procedures associated with proper dismounting from disk drive 40. The flow then proceeds to block 314 for returning to block 206 of FIG. 2.

Returning to FIG. 1, the external disk drive system 10 may further comprise a storage device 80, such as a memory card reader, that is in communication with the external device 30a via the communication medium 31a. In this embodiment of the present invention, the storage device 80 remains in communication with the external device 30a following the mounting and dismounting process described in FIGS. 2-3. For example, if the storage device 80 is in communication with the host 30a via a USB cable 31a connected to the BCH interface 21a, the connecting of a higher interface priority Firewire™ cable 31b to BCH interface 21b will not cause the dismounting of the storage device 80 from the host 30a. In this way, the host 30a remains in communication with the storage device 80 via USB cable 31a but now communicates with the disk drive 40 only over the later connected Firewire™ cable 31b.

One advantage of the foregoing feature of the present invention over the prior art is that by switching BCH interfaces, such as from 21a to 21b, while the drive is in operation, the present invention reduces the occurrence of an undefined state in the external disk drive system 10 wherein the most recently connected interface cable, such as a Firewire™ cable 31b, remains in a dismounted state and thus unused. In addition, the use of the present invention renders unnecessary the prior art requirements for the external disk drive system 10 to be power cycled before the most recently connected interface cable becomes mounted to the external disk drive system 10, thus reducing delays and suspensions in the operational status of the external disk drive system 10.

It should be noted that the various features of the foregoing embodiment were discussed separately for clarity of description only and they can be incorporated in whole or in part into a single embodiment of the invention having all or some of these features. It should further be noted that the invention is not limited to disk drive systems but can be readily used in conjunction with virtually any device adapted for bi-directional communication with an external device via a plurality of communication mediums and BCH interfaces.

What is claimed is:

1. In an external disk drive system comprising a disk drive, a bridge controller comprising a plurality of Bridge Controller Host (BCH) interfaces adapted to establish communication between the external disk drive system and an external device via a plurality of different communication mediums, a method for switching from a first BCH interface communicating with the external device via a first communication medium to a second BCH interface during the operation of the external disk drive system, the method comprising:

sensing a connecting of a second communication medium to the external disk drive system via the second BCH interface;

determining an interface priority of the second communication medium relative to an interface priority of the first communication medium;

communicating a request for dismounting the disk drive from the external device via the first BCH interface;

dismounting the disk drive from the first communication medium if a valid response is received from the external device via the first BCH interface; and mounting the disk drive to the second communication medium wherein the external disk drive system remains operational during the dismounting and mounting.

2. The method of claim 1, wherein the external device is a host computer.

3. The method of claim 1, wherein the external disk drive system is adapted to communicate with a plurality of external devices via the plurality of BCH interfaces and the plurality of different communication mediums.

4. The method of claim 1, wherein the determining, the dismounting and the mounting are performed at least in part by firmware executed in the bridge controller.

5. The method of claim 1, wherein the interface priority of the first communication medium is pre-assigned.

6. The method of claim 1, wherein the interface priority of the second communication medium is pre-assigned.

7. The method of claim 1, wherein the external disk drive system further comprises a storage device in communication with the external device via the first communication medium, and wherein the storage device remains in communication with the external device.

* * * * *